Oct. 5, 1965          C. S. CHARRON ETAL         3,209,550
                    VEHICLE AIR CONDITIONING UNIT
Filed Oct. 1, 1962                          4 Sheets-Sheet 1

INVENTORS
CHARLES STANFIELD CHARRON
JAROSLAV J. HAVLIK
BY
ATTORNEYS

Oct. 5, 1965    C. S. CHARRON ETAL    3,209,550
VEHICLE AIR CONDITIONING UNIT
Filed Oct. 1, 1962    4 Sheets-Sheet 2

INVENTORS
CHARLES STANFIELD CHARRON
JAROSLAV J. HAVLIK
BY *Georges Pinkes*
ATTORNEYS

INVENTORS
CHARLES STANFIELD CHARRON
JAROSLAV J. HAVLIK
BY
ATTORNEYS

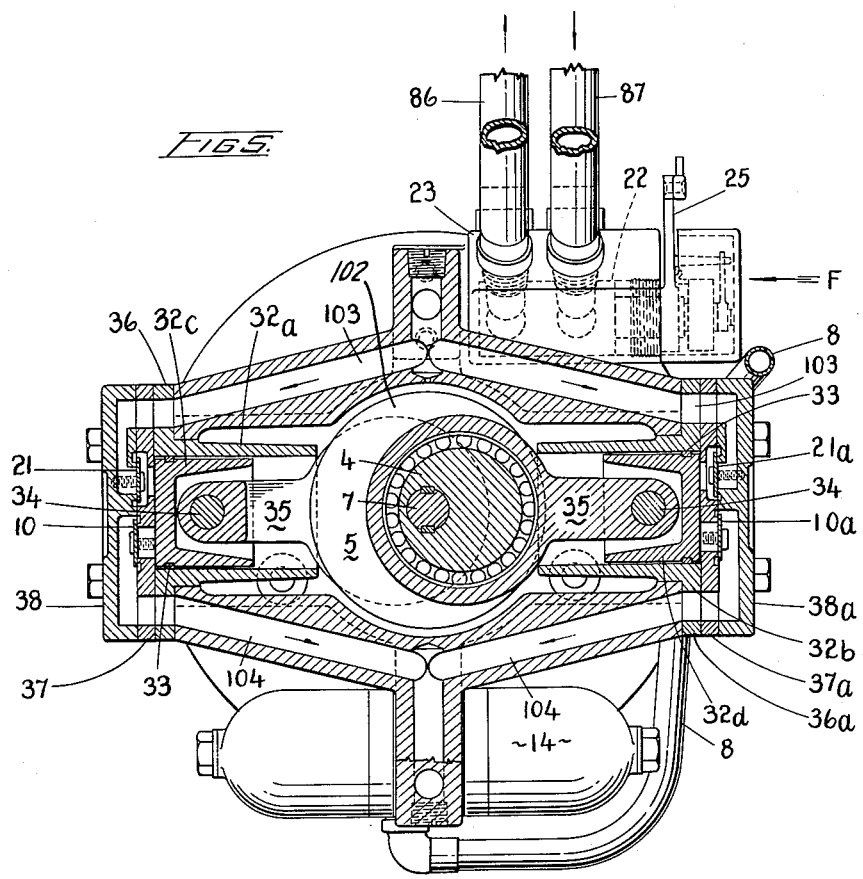
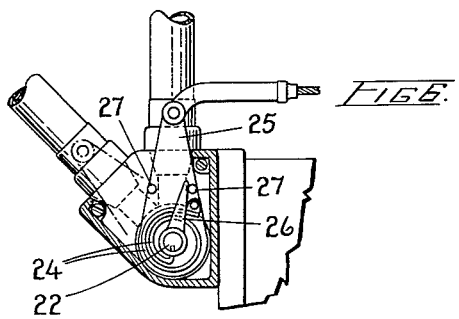
INVENTORS
CHARLES STANFIELD CHARRON
JAROSLAV J. HAVLIK
ATTORNEYS

United States Patent Office 3,209,550
Patented Oct. 5, 1965

3,209,550
VEHICLE AIR CONDITIONING UNIT
Charles S. Charron, 145 Veronica Drive, Port Credit, Ontario, Canada, and Jaroslav J. Havlik, 952 Hamilton St., Preston, Ontario, Canada
Filed Oct. 1, 1962, Ser. No. 227,189
15 Claims. (Cl. 62—156)

This invention relates to an air cooling machine and in particular to a self-contained machine in which the cooling unit consisting of a compressor, condenser and an evaporator are constructed as a single unit.

The air cooling machine of the present invention is adaptable for use in cooling the interior of passenger automobiles but it is not limited to that particular application because it will be apparent that the machine has many applications in addition to the specific one mentioned. However, for the purpose of illustrating and describing the operation and construction of the machine, it will be described with reference to its use in cooling the air in the passenger compartment of a passenger automobile but it is to be understood that the invention is not limited to such particular use.

An object of the present invention is to provide a self-contained air cooling unit in which all of the units essential for the refrigeration of the cooling medium, with the exception of the driving power, are factory assembled and tested as a unit.

A further object of the invention is to provide a unit which, during the summer months will use the automobile heater, through which liquid cooled by the refrigeration unit of the machine, is passed by means of an impeller. In areas that do not use hot water heaters the unit can be arranged to draw air from the car interior, circulate it over the evaporator coils and pump it back into the interior of the car or area to be cooled.

A still further object of the invention is to provide an air conditioning machine which can be operatively installed without knowledge of refrigeration servicing. For example the machine can be installed in an automobile by the automobile mechanic who regularly services the automobile without any knowledge of refrigeration servicing.

One of the advantages of the present invention is in its compactness and the complete unit can be installed in the engine compartment of the automobile.

Some of the other advantages of the air conditioning machine of the present invention are briefly as follows:

(a) The machine can be quickly installed in a motor vehicle;

(b) The machine can be readily removed for exchange, repair, when it requires servicing or for removal and installation in another automobile;

(c) The machine does not require refrigeration experts to instal: The same can be installed by persons unskilled in this field such as the ordinary automobile mechanic.

Other and further objects and advantages of the present invention will be apparent from the following description which, as previously mentioned, is described in use with an automobile.

The air conditioning unit of the present invention comprises the combination of a housing, a shaft mounted centrally in said housing, a compressor formed within the housing and driven by said shaft, extensions on said shaft projecting outwardly from opposite sides of said housing, a refrigeration unit operatively associated with said compressor, said refrigeration unit including an evaporator having evaporator coils and a condenser having condenser coils, a closed chamber housing said evaporator, said chamber forming a heat exchanger having a fluid circulating therethrough, an impeller in said housing, said impeller being mounted on and driven by one of the extensions of the said shaft, an air impeller driven by the other extension of said shaft and directing air over the condenser mounted adjacent thereto and a driving pulley mounted on said shaft. When the air conditioning unit is used in conjunction with a motor vehicle or automobile the heat exchange device which is used for heating the interior of the passenger compartment is, by means of a valve system, isolated from the engine cooling system and the isolated portion of the liquid directed through the above mentioned chamber where it is cooled and recirculated through the heat exchanger.

Other and further features of the invention will be apparent from the following description and the accompanying drawings in which:

FIGURE 5 is a sectional view on the line 5—5 of FIGURE 2 showing the arrangement of the compressor and its internal piping, the eccentrics which reciprocate the pistons of the compressor, valve systems and the dual three way coolant valves.

FIGURE 6 is a fragmentary side elevation taken in the direction of the arrow F in FIGURE 5 showing an automatic defrosting device;

Figure 1:
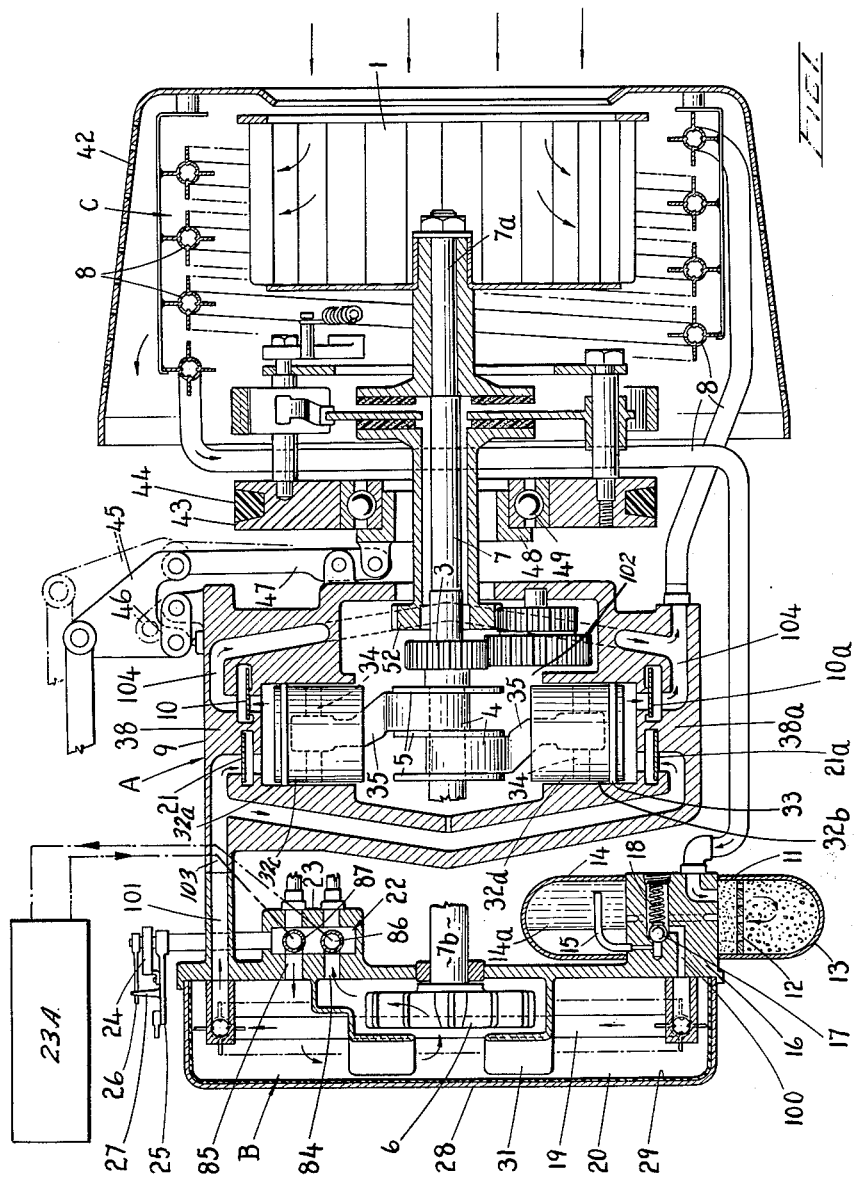
FIGURE 1 is a schematic cross section showing the arrangement of the four main components, namely the blower-condenser, the automatic speed changer, the refrigeration compressor, the evaporator and the heat exchanger and the automatic speed changer.
Figure 2:
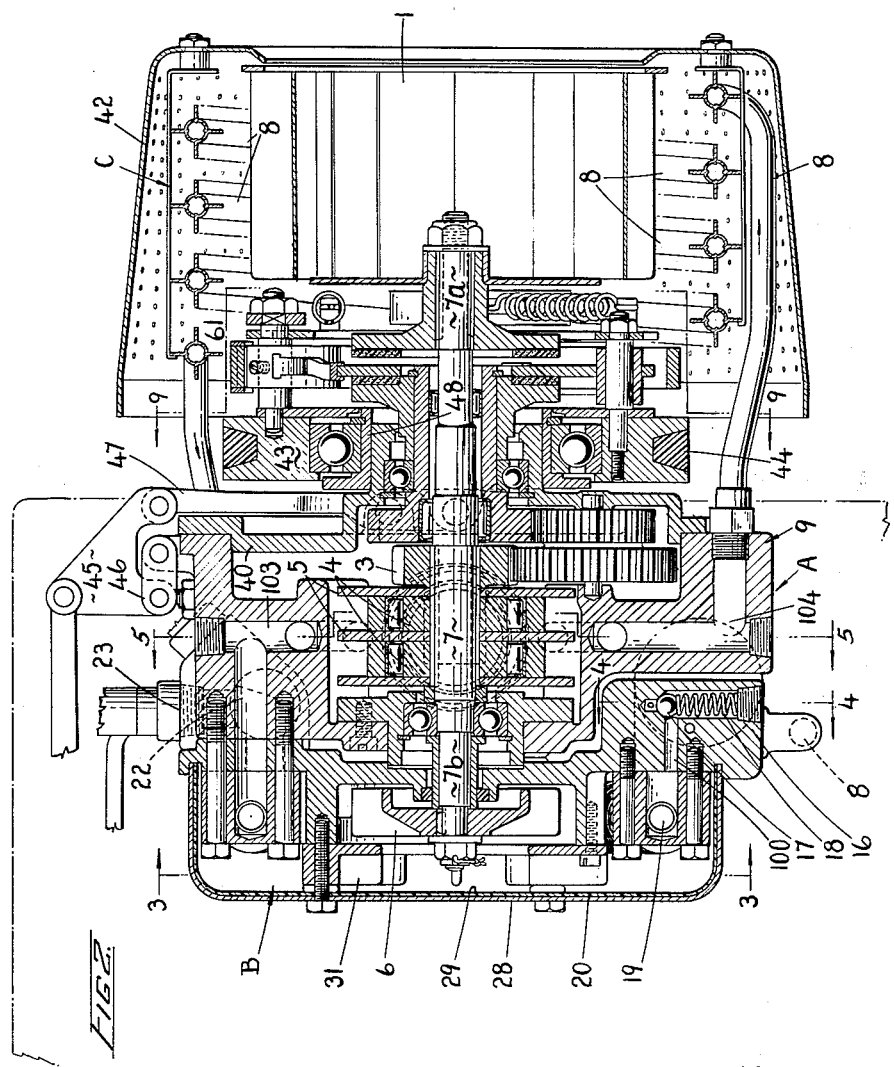
FIGURE 2 is a vertical cross section on the longitudinal axis of the machine designed in accordance with the schematic illustration in FIGURE 1.

Referring to FIGURE 1 which is a schematic drawing of the air conditioning unit constructed in accordance with the present invention the same comprises three basic units built around and driven by a common shaft, the three units consisting of a compressor A disposed between an evaporator unit generally indicated by the letter B and a condenser unit generally indicated by the letter C.

The compressor unit A may be of any of the kinds presently in use in refrigeration systems such as rotary or piston types. For the purpose of illustrating our invention we have shown the compressor as being of the reciprocating type employing a reciprocating piston for the purpose of pressurizing the refrigerant. In the present construction the compressor comprises a housing 9 formed with a pair of oppositely disposed cylinders 32a, 32b in which is mounted a pair of opposed pistons 32c, 32d respectively. The central portion of the housing 9 is formed hollow to form a crank case 102 formed within the walls of the housing 9 is an inlet duct 103 which communicates with the evaporator unit as hereinafter described and with each of the cylinders 32a, 32b and a discharge duct 104 which communicates with the cylinders 32a, 32b and the ducts of the condenser as hereinafter described. The flow of Freon gas (the refrigerant) in the correct direction through the compressor is achieved by intake valves 21–21a and exhaust valves 10, 10a located in the ducts 103 and 104 respectively. In the construction shown the foresaid valves are located in the cylinder heads 38, 38a.

Journalled in the housing and passing centrally through the crank case is a drive shaft 7 which is formed with extensions 7a, 7b which extend respectively into the evaporator unit B and the condenser unit C for the purpose to be hereinafter described. The pistons are reciprocated by means of eccentrics 4, 4 mounted on the shaft 7 within the crank case, the eccentrics being held in proper position by means of spacers 5. Each piston is connected to its respective eccentric by means of a connecting rod 35 and wrist pin 34. A fluid tight seal is maintained between the piston and its respective cylinder wall by a compression ring 33. The cylinders 32a, 32b are made separately from the housing and are formed with flanges 36, 36a which are clamped in their operative position by the cylinder heads 38, 38a. The intake valve 21 and exhaust valve 10 are each carried by a valve plate 37 and similarly the intake valve 21a and exhaust valve 10a are carried by a valve plate 37a. Each valve plate, as will be seen in FIGURE 6 is clamped between its respective cylinder head and the flanges 36, 36a respectively. This specific construction makes for very easy repair and servicing of the valve mechanism related to the compressor.

Figure 3:
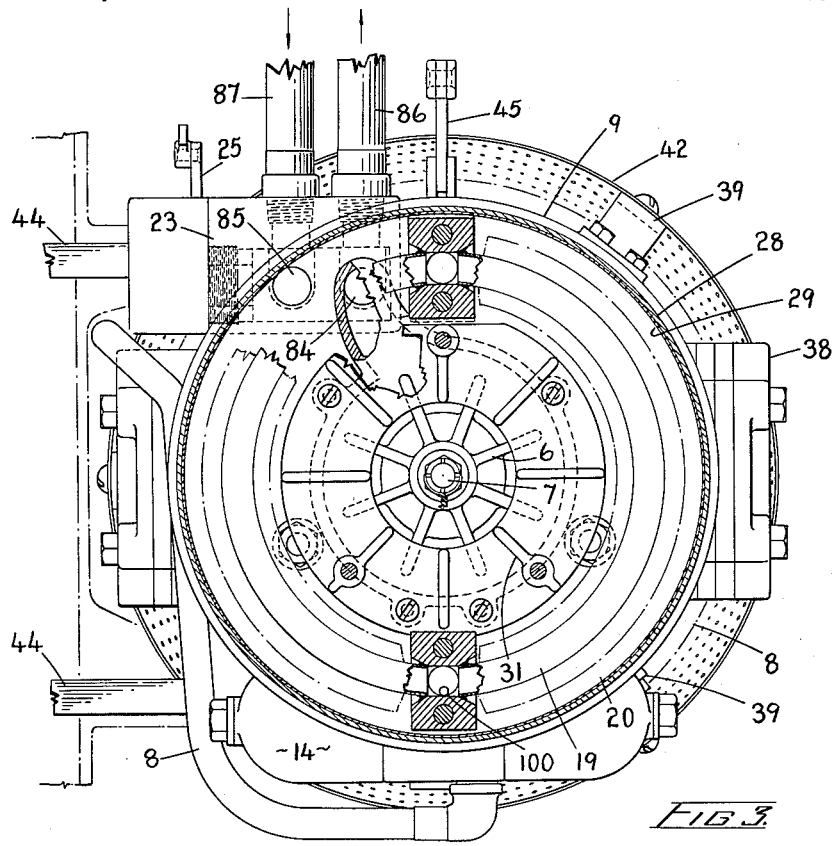
FIGURE 3 is a sectional view on the line 3—3 of FIGURE 2 showing the centrifugal impeller, the evaporator coil and the three way coolant valve controlling the flow of cooled liquid to the car heater system.
Figure 4:
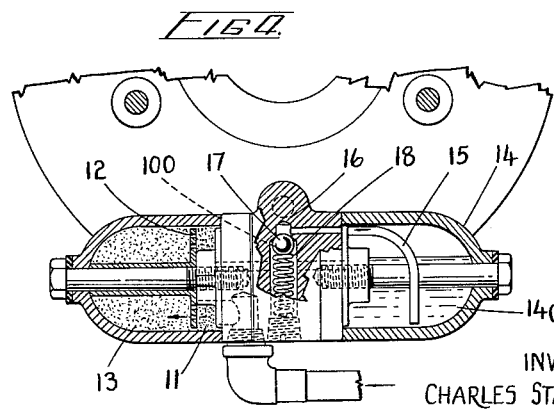
FIGURE 4 is a sectional view on the line 4—4 of FIGURE 2 showing the construction of the liquid receiver, the liquid strainer, drier and the expansion valve of the evaporator unit.

The evaporator unit B which forms the secondary heat exchange comprises a receiving tank 14, evaporator coils 19 confined within a closed chamber 20, which forms a heat exchanger for the car heater unit. The discharge side of the evaporator coils 19 being connected to the outlet 101 which in turn is connected to the inlet duct 103 of the compressor. The inlet side of the evaporator coil 19 is connected to the discharge side of the receiving tank at 100. The extension 7b of the shaft extends into the chamber 20 and has mounted thereon an impeller 6. The cooled and liquefied Freon is delivered to the receiving tank where it passes through a felt 11, screen 12, desiccant 13 into the chamber 14a of the receiving tank, through the pipe 15 and is allowed to pass through the expansion valve 16, by forcing the ball 17 down against the spring 18. The liquified gas expands inside the evaporator coils 19 and is drawn into the compressor to be recycled. The impeller is surrounded by a scroll housing 31 which directs fluid which circulates through the chamber 20 directing it to an outlet 84. The chamber 20 is also provided with an inlet 85. The flow of fluid through the chamber 20 is controlled by a three way valve 22 enclosed within the valve body 23. This valve is used to shut off the engine hot water and allows that part of the engine hot water which is normally contained within the existing car water heating system (represented in diagrammatic fashion in FIGURE 1 and designated by the numeral 23A) to be repeatedly recirculated through the chamber 20 when it is desired to cool the air in the passenger compartment of an automobile. As will be seen in FIGURES 1 and 3 the outlet 84 is connected to the car heater which forms the primary heat exchange by the conduit 86 and returned to the chamber through the inlet 85 by the conduit 87. The blower or fan air circulating system that is part of the car heater system, through which is circulating refrigerated coolant from the chamber 20, circulates the air over the car heater thereby cooling the inside of the car.

To avoid a build-up of ice on the outside of the car heater, a bi-metal element 24 has one end fastened to the barrel of the valve 22 and the other end fastened to a lever 25 which turns the valve barrel 22. When the temperature of the coolant in the car heater system becomes lower than a pre-set value, the bi-metal element 24 rotates the valve 22 slightly and allows a portion of the hot water from the car engine system to circulate through the heat exchanger and car heater thereby quickly defrosting the outside of the car heater. Peg 26 and stops 27 limit the rotation of the barrel of the valve 22 and also allows the valve to be shut off when the lever 25 is in the off-position. The lever 25 is actuated by a flexible push pull wire with the handle located on the automobile dash board. The lever is shown in the on-position and in that position the air conditioning unit will be operative to cool the interior of the automobile whenever the driving mechanism of the machine, to be hereinafter described, is set in operation. In the winter time or at other times when heat is required in the interior of the car the lever will be rotated to the off-position which will cause the heated engine water to circulate through the car heating system. The wall 28 of the chamber 20 is insulated on the inside with a coating 29 to lower heat transfer.

The condenser unit C is associated with the side of the compressor opposite to that which is associated with the evaporator unit B. The condenser unit C comprises condensing coils 8 which are wound in a spiral fashion to surround the shaft extension 7a, the coils 8 being supported by brackets 39 which are bolted to the compressor cover 40 forming part of the housing 9. Mounted on the extension 7a and driven thereby is an air impeller 1 which is confined between the loops of the condenser coil 8. The condenser coils 8 are enclosed by a perforated cover 42 which allows a portion of the air to go through it but to deflect a portion over the compressor to assist in cooling the same. The cover 42 is secured to the outside end of the bracket 39.

The machine when used in conjunction with an automobile is bolted to the engine block. The driving mechanism for the machine will now be described. A driving pulley 43 is rotatably journalled to rotate about the axis of the shaft 7 and is driven by the engine through the medium of the pulley belt 44. The pulley 43 continuously runs whenever the engine runs but a manual clutch is provided to disengage the air conditioner when it is not required for cooling the passenger compartment of the automobile. It will be seen by reference to the schematic drawing that the driving pulley 43 is mounted coaxial with the shaft 7 to be shiftable longitudinally thereon into and out of driving position by means of toggle levers 45 and 46, which are actuated by a flexible push pull with the handle located on the automobile dash board, forked lever arm 47 operatively connected to the sleeve 48 on which the pulley is mounted by thrust bearing 49. When the toggle levers 45 and 46 are in the position shown in dotted lines in FIGURE 1 the forked lever 47 floats freely in a neutral position and the machine is not operating although the pulley 43 may be rotated by the engine.

The embodiments of the invention in which an exclusive property or privilege is claimed are defined as follows:

1. In an air conditioning unit, the combination of a housing, a shaft mounted centrally in said housing, a compressor formed within the housing and driven by said shaft, extensions on said shaft projecting outwardly from opposite sides of said housing, a refrigeration unit having a closed refrigerant circulating conduit system through which a refrigerant flows and which system communicates with said compressor whereby said refrigerant is compressed, said refrigeration unit including an evaporator having evaporator coils, and an expansion valve means in the refrigeration circuit forming part of said conduit system for the refrigerant; a closed chamber housing said evaporator, said chamber having an inlet and outlet connected to a primary heat exchanger by a liquid circulating conduit through which a liquid is circulated, an impeller in said chamber circulating the liquid over the evaporator and through the primary heat exchanger and its conduits, said impeller being mounted on and driven by one of the extensions of said shaft, an air impeller driven by the other extension of said shaft and directing air over the condenser mounted adjacent thereto and a driving pulley mounted on said shaft.

2. In an air conditioning unit the combination of a housing, a pair of opposed cylinders formed within the housing, a crank case between said cylinders, a shaft mounted centrally in said housing between said cylinders and extending through said crank case, a piston mounted in each cylinder and operatively connected to said shaft for reciprocation thereby, said pistons and cylinders forming a compressor, extensions on said shaft projecting outwardly from opposite sides of said housing, a refrigeration unit having a closed refrigerant circulating conduit system through which a refrigerant flows and which system communicates with said compressor whereby said refrigerant is compressed, said refrigeration unit including an evaporator having evaporator coils, a condenser having condenser coils and an expansion valve means in the refrigeration circuit forming part of said conduit system for the refrigerant, a closed chamber housing said evaporator, said chamber having an inlet and outlet connected to a primary heat exchanger by a liquid circulating conduit through which a liquid is circulated, an impeller in said chamber circulating the liquid over the evaporator and through the primary heat exchanger and its conduits, said impeller being mounted on and driven by one of the extensions of said shaft, an air impeller driven by the other extension of said shaft, and directing air over the condenser mounted adjacent thereto, and a driving pulley mounted on said shaft.

3. In an air conditioning unit for use with a variable speed internal combustion engine having a water cooling system, the combination of a housing, a pair of opposed cylinders formed within the housing, a crank case between said cylinders, a shaft mounted centrally in said housing between said cylinders, extensions on said shaft projecting outwardly from opposite sides of the housing, a piston mounted in each cylinder and operatively connected to said shaft for reciprocation thereby, said pistons and cylinders forming a compressor; a primary heat exchanger having a fluid circulating conduit system connected to the water cooling system for the engine and to a secondary heat exchanger, said secondary heat exchanger comprising a refrigeration unit having a closed refrigerant circulating conduit system through which a closed refrigerant flows and which system communicates with said compressor whereby said refrigerant is compressed, said refrigeration unit including an evaporator having evaporator coils, a condenser having condenser coils, and an expansion valve means in the refrigeration circuit forming part of said conduit system for the refrigerant, a closed chamber housing said evaporator, said chamber having an inlet and an outlet connected to the primary heat exchanger by a liquid circulating conduit through which coolant from the cooling system may be circulated, a coolant control valve arranged in said inlet and outlet to isolate a portion of coolant from the cooling system, an impeller in the housing for circulating the said portion of coolant through the primary heat exchanger and over the evaporator coils in said chamber to effect a transfer of heat from the primary heat exchanger to the secondary heat exchanger, said impeller being mounted on and driven by one of the extensions of said shaft, a blower mounted on and driven by the other extension of said shaft, the condenser being mounted adjacent said blower, and a driving pulley mounted on said shaft and arranged to be driven by the engine.

4. In an air conditioning unit according to claim 3 a thermostatic valve responsive to the temperature of the primary heat exchanger and operatively associated with the coolant control valve to admit heated coolant from the engine cooling system to the primary heat exchanger when the latter falls below a pre-set value to thereby avoid build-up of ice on the exterior of the primary heat exchanger.

5. In an air conditioning unit according to claim 3 wherein the evaporator unit is mounted directly on the compressor housing.

6. In an air conditioning unit according to claim 3 wherein the evaporator unit is mounted directly on one side of the compressor housing and the condenser is mounted on the opposite side of the compressor housing.

7. In an air conditioning unit according to claim 3 in which the impeller is enclosed within a pump scroll directing the said portion of engine coolant over the evaporator coils.

8. In an air conditioning unit for use with a variable speed water cooled internal combustion engine, the combination of a housing, a shaft mounted centrally in said housing, said shaft having extensions projecting outwardly from opposite sides of said housing, a compressor formed within the housing and driven by the said shaft, a primary heat exchanger having a fluid conduit system connected to and communicating with the engine cooling system and a secondary heat exchanger comprising a refrigeration unit having a closed refrigerant circulating conduit system through which a refrigerant flows and which system communicates with said compressor whereby said refrigerant is compressed, said refrigeration unit including an evaporator having evaporator coils, a condenser having condenser coils, and an expansion valve means in the closed refrigerant circulating conduit system, a closed chamber housing said evaporator and forming part of the fluid conduit system of the primary heat exchanger, said chamber also having an inlet and outlet connected to the engine cooling system permitting a portion of the engine coolant to circulate through the primary heat exchanger, a coolant control valve arranged in said inlet and outlet to isolate the primary heat exchanger from the engine cooling system, an impeller in the chamber for circulating fluid through the primary heat exchanger and over the evaporator coils in said chamber said impeller being mounted on and driven by one of the extensions of said shaft, a blower mounted on and driven by the other extension of said shaft, the condenser being mounted adjacent said blower, and a driving pulley mounted on said shaft and arranged to be driven by said engine.

9. In an air conditioning unit according to claim 8, a thermostatic valve responsive to the temperature of the primary heat exchanger and operatively associated with the coolant control valve to admit heated coolant from the engine cooling system to the primary heat exchanger when the latter falls below a pre-set value to thereby avoid build-up of ice on the exterior of the primary heat exchanger.

10. In an air conditioning unit according to claim 8 wherein the evaporator unit is mounted directly on the compressor housing.

11. In an air conditioning unit according to claim 8 wherein the evaporator unit is mounted directly on one side of the compressor housing and the condenser is mounted on the opposite side of the compressor housing.

12. In an air conditioning unit according to claim 8 in which the impeller is enclosed within a pump scroll directing the said portion of engine coolant over the evaporator coils.

13. In an air conditioning unit, the combination of a housing, a shaft mounted centrally in said housing, a compressor formed within the housing and driven by said shaft, extensions on said shaft projecting outwardly from opposite sides of said housing, a refrigeration unit having a closed refrigerant circulating conduit system through which a refrigerant flows and which system communicates with said compressor whereby said refrigerant is compressed, said refrigeration unit including an evaporator having evaporator coils, a condenser having condenser coils, and an expansion valve means in the refrigerant circulating conduit system, a closed chamber housing said evaporator, said chamber having an inlet and outlet connected to a primary heat exchanger by a liquid circulating conduit through which a liquid is circulated, an impeller in said chamber circulating the liquid over the evaporator and through the primary heat exchanger and its conduits to effect a transfer of heat from liquid contained in the chamber and the refrigeration unit, an air impeller mounted on and driven by one of the extensions of said shaft to direct air over the condenser, and a driving pulley mounted on said shaft.

14. In an air conditioning unit according to claim 13 wherein the evaporator unit is mounted directly on one side of the compressor housing and insulated therefrom and the condenser is mounted on the opposite side of the compressor housing.

15. In an air conditioning unit according to claim 13 in which the impeller is enclosed within a pump scroll directing the fluid over the evaporator coils.

References Cited by the Examiner

UNITED STATES PATENTS

| | | | |
|---|---|---|---|
| 1,145,226 | 7/15 | Bertsch | 62—499 X |
| 1,315,282 | 9/19 | Carpenter | 62—499 X |
| 1,631,278 | 6/27 | Loranger et al. | 62—498 |
| 1,877,390 | 9/32 | Davis | 62—498 |
| 2,056,050 | 9/36 | Harris | 192—48 X |
| 2,184,135 | 12/39 | Batten | 192—48 |
| 2,229,500 | 1/41 | Goldsmith | 62—499 X |
| 2,406,238 | 8/46 | Miller | 192—48 |
| 2,463,997 | 3/49 | Rodgers | 29—157.3 |
| 2,472,750 | 6/49 | Lavash | 192—48 |
| 2,537,797 | 1/51 | Simpelaar | 165—179 |
| 2,693,026 | 11/54 | Simpelaar | 29—157.3 |
| 2,761,293 | 9/56 | Eubank | 62—243 X |
| 2,787,129 | 4/57 | Evans | 62—323 X |
| 2,811,841 | 11/57 | Grimshaw | 62—499 X |
| 2,975,614 | 3/61 | McGuffey | 62—243 X |
| 2,979,971 | 4/61 | Sampietro | 62—243 X |
| 3,081,824 | 3/63 | Macall | 165—179 |

ROBERT A. O'LEARY, *Primary Examiner*.

CHARLES SUKALO, *Examiner*.